US008629881B2

(12) United States Patent
Blonde et al.

(10) Patent No.: US 8,629,881 B2
(45) Date of Patent: Jan. 14, 2014

(54) METHOD OF COLOR MAPPING FROM NON-CONVEX SOURCE GAMUT INTO NON-CONVEX TARGET GAMUT

(75) Inventors: Laurent Blonde, Thorigne Fouillard (FR); Jürgen Stauder, Montreuil sur Ille (FR); Wolfgang Endress, Villingen-Schwenningen (DE)

(73) Assignee: Thomson Licensing, Boulogne-Billancourt (FR)

( * ) Notice: Subject to any disclaimer, the term of this patent is extended or adjusted under 35 U.S.C. 154(b) by 870 days.

(21) Appl. No.: 12/452,741

(22) PCT Filed: Jul. 25, 2008

(86) PCT No.: PCT/EP2008/059837
§ 371 (c)(1),
(2), (4) Date: Jan. 20, 2010

(87) PCT Pub. No.: WO2009/016136
PCT Pub. Date: Feb. 5, 2009

(65) Prior Publication Data
US 2010/0128055 A1  May 27, 2010

(30) Foreign Application Priority Data

Jul. 27, 2007  (EP) .................................. 07301277

(51) Int. Cl.
*G09G 5/02* (2006.01)
(52) U.S. Cl.
USPC ........... 345/590; 345/589; 345/591; 382/167; 358/1.9
(58) Field of Classification Search
USPC .................... 345/589–591; 382/167; 358/1.9
See application file for complete search history.

(56) References Cited

U.S. PATENT DOCUMENTS

| 4,879,595 | A | * | 11/1989 | Niki et al. ..................... 358/539 |
| 5,704,026 | A | | 12/1997 | Wan |
| 6,480,301 | B1 | | 11/2002 | Cholewo |
| 7,859,554 | B2 | * | 12/2010 | Young ........................... 345/690 |

(Continued)

FOREIGN PATENT DOCUMENTS

| EP | 0592141 | 4/1994 |
| EP | 0626783 | 10/1998 |

(Continued)

OTHER PUBLICATIONS

Search Report Dated Oct. 2, 2008.

(Continued)

*Primary Examiner* — Xiao M. Wu
*Assistant Examiner* — Todd Buttram
(74) *Attorney, Agent, or Firm* — Tutunjian & Bitetto, P.C.

(57) ABSTRACT

Method of mapping source colors from a source color device having an actual source gamut that is represented by a source convex (gamut boundary descriptor) and a source non-convex into target colors for a target color device having an actual target gamut that is represented by a target convex and a target non-convex, comprising, 1—if the source color to map is located outside the source non-convex, a pre-mapping step that maps the source color into the source non-convex,
2—if the mapped target color is located outside the target non-convex, a post-mapping step that maps the target color into the target non-convex.

This method allows precise gamut mapping while allowing also for simple geometrical operations using convex gamuts.

4 Claims, 5 Drawing Sheets

(56) References Cited

U.S. PATENT DOCUMENTS

| | | |
|---|---|---|
| 2003/0174885 A1* | 9/2003 | Levy et al. .................... 382/167 |
| 2007/0052719 A1 | 3/2007 | Tin |
| 2007/0081176 A1 | 4/2007 | Newman et al. |
| 2007/0085855 A1 | 4/2007 | Tin |
| 2009/0102968 A1* | 4/2009 | Doser et al. ................... 348/467 |

FOREIGN PATENT DOCUMENTS

| | | |
|---|---|---|
| EP | 0592141 | 9/1999 |
| JP | 6225131 | 8/1994 |
| JP | 7030774 | 1/1995 |
| WO | WO 2007/024494 | 3/2007 |

OTHER PUBLICATIONS

Montag et al.: Gamut mapping: Evaluation of Chroma Clipping Techniques for Three destination gamuts. Published in 1998 at the IS&T/SID Sixth Color Imaging conference in Scottsdale.

Balasubramanian et al.: "A method of qualifying the color gamut of an output device" published in 1997 in the Proceedings of SPIE, vol. 3018.

Giesen et al.: Toward image-dependent gamut mapping: fast and accurate gamut boundary determination. Proc. SPIE 5667, Jan. 17, 2005.

\* cited by examiner

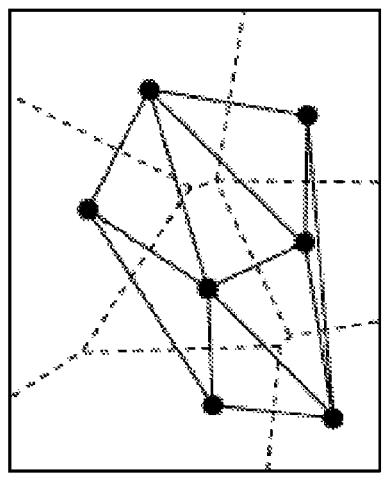
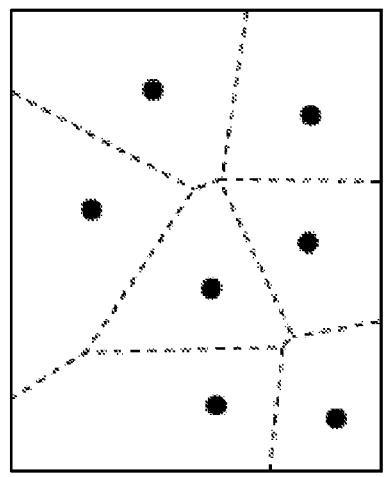
Fig.4　　　　　　　　　　Fig.3
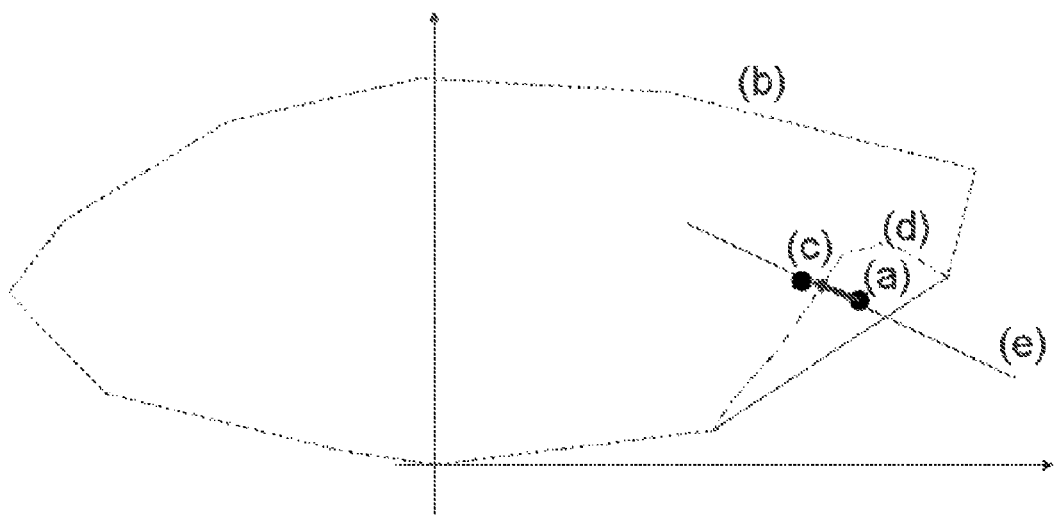
Fig.6

METHOD OF COLOR MAPPING FROM NON-CONVEX SOURCE GAMUT INTO NON-CONVEX TARGET GAMUT

This application claims the benefit, under 35 U.S.C. §365 of International Application PCT/EP2008/059837, filed Jul. 25, 2008, which was published in accordance with PCT Article 21(2) on Feb. 5, 2009 in English and which claims the benefit of European patent application No. 07301277.5, filed Jul. 27, 2007.

The invention relates to the field of gamut boundaries for color devices, and more particularly relates to the computation of a gamut boundary description for a color device.

Gamut mapping is used to reproduce an image rendered by an input color device on an output color device, since the input device and the output device typically have different gamut boundaries with respect to each other. In other words, the gamut of colors that can be reproduced by the input device is typically not the same as the gamut of colors that can be reproduced by the output device. Gamut mapping can be used to render the image from within the input device gamut boundary to within the output device gamut boundary, so as to more accurately reproduce the color image on the output device.

The term "color gamut" or gamut generally is used to describe the complete range of colors an image contains or a color device is able to render. It is sometimes referred to as a color gamut or the gamut color space associated with a printer or screen display device. Gamut mapping an image for instance onto a screen or printer generally requires adjusting the colors of the image to fit in the constrained color gamut of the screen or printer. In some cases, the image being displayed does not have a wide range of colors and therefore does not fill or utilize the wider range of colors in the printer gamut or even the screen gamut. In other cases, the colors in an image are outside the narrow color gamut of a displaying device but can be printed on a color printer having a wider gamut.

A color gamut may contain all colors that can be reproduced by a specific display or printing device or that can be transmitted or stored when using for instance a specific medium or standard. A color gamut can also be used to characterize all colors that occur in an image or in a video. Cameras, palm tops, cell phones, Internet terminals and digital picture frames generate images using specific color gamuts in YCC, xvYCC, Adobe RGB, bgRGB, scRGB, CIELAB, e-sRGB or ROMM digital representations.

Gamut mapping of image data from a source color gamut to a target color gamut is typically performed using a gamut mapping algorithm ("GMA"), which is a particular method of mapping color data between gamuts. A gamut mapping algorithm often makes use of data that defines the boundaries of the color gamut of the input and the output color devices, in order to obtain a reference between the two gamuts for appropriate gamut mapping of the image. Such data defining the gamut color boundary can be referred to as a gamut boundary description ("GBD"). See for instance US2007/081176.

In measurement-based color management systems, the gamut boundary description is typically computed at run time. It is therefore preferred that the gamut boundary description be computed quickly and without significant impact on system resources, such as memory.

One convenient representation of a gamut boundary is as a set of convex, planar polygons. A well-known method to obtain such a set of bounding polygons is by computing the convex hull of device-independent colors associated with a set of color samples for the device. When a measurement-based color management system uses a measurement-based color profile, an adequate set of sample values is typically provided by the color profile. One approach for obtaining the sample values used to compute the gamut boundary description is to select a set of sample values in the device-dependent color space of the device, and to convert the selected values to device-independent color space using a source transform, which converts colors from device-dependent color space to device-independent color space. The gamut boundary description can then be determined by taking a convex hull of the resulting device-independent color values.

To define the gamut color boundary of a color device, several shells can be used, as disclosed for instance in the documents US2007/052719 and US2007/085855, then forming a gamut boundary description system ("GBDS").

Although there are other ways to determine the bounding set of polygons given a set of sample values within the gamut volume, the convex hull is the preferred representation. One recent example of convex gamut boundaries is the implementation of Pellegri and Schettini described in their paper "Gamut boundary determination for a colour printer using the Face Triangulation Method" published in 2003 in the Proceedings of SPIE Vol. 5008. The authors assume that a color space point lies on a surface of the gamut when at least one of the color coordinates attains its minimum or maximum value. To these points in color space, a triangulation is applied resulting in a polygon representing the GBD.

But, in a large number of cases, gamut boundaries are non-convex (concave) surfaces and the convexity assumption as used for convex hull calculation would lead to an overestimation of the gamut volume. For example, printing devices based on the subtractive principle have often non-convex device gamut boundaries. For calculation of non-convex gamut boundaries, a number of methods are known. A typical reference is Cholewo and Love who present in their paper entitled "Gamut boundary determination using alpha-shapes" published in the Proceedings of the 7th Color Imaging Conference in 1999 an algorithm of gamut boundary description based on alpha shapes. See the corresponding patent U.S. Pat. No. 6,480,301. Using a parameters alpha, a whole family of shapes can be generated going from convex hull to very fine, non-convex descriptions.

FIG. 1 shows the geometry of a sample two-dimensional gamut mapping algorithm (GMA) that maps colors from a source gamut with non-convex Gamut Boundary Description (GBD) (line with ref. a) into a target gamut with non-convex GBD (line with ref. b) along a mapping line (ref. c). Usually, GMA determines intersections of the mapping line with source and target GBDs and then determine a one-dimensional mapping function for each color on this mapping line that indicates how far it should be moved along this mapping line. But, as shown in this example, because the gamut boundaries are non-convex, there are multiple intersections between the mapping lines and the GBDs. Therefore, a simple mapping function will not give satisfying results for this example. Moreover, since GMA not only move colors inside the target GBD but may want to satisfy a number of additional conditions such as contrast preservation, hue preservation and preservation of color homogeneity, the mapping will still be more difficult. Even the very usual strategy of mapping along lines may not be appropriate.

The document WO2007/024494 proposes a gamut mapping method for non-convex gamuts including the following steps:

transforming device-dependent source colors into device independent source colors using a source device model.

forming a source convex gamut from the source non-convex gamut.

forming an expanded source device model such that all device independent, warped source colors fill the source convex gamut in the warped color space.

By this gamut mapping method, although the source gamut is actually non-convex, the gamut mapping main algorithm operates with a source convex gamut and can then use simplified geometrical operations. A similar approach is proposed by R. Balasubramanian and E. Dalal in their paper entitled "A method for quantifying the color gamut of an output device" published 1997 in the Proceedings of SPIE, Volume 3018.

A problem of this method is that the non-convex shape of the source gamut is completely hided to the gamut mapping algorithm that operates in a warped color space. The main gamut mapping operation has no access to the actual source color values and color differences are distorted too. The colors are not modified by the main gamut mapping operation only, but also by the preliminary operation of forming the convex gamut with the expanded source device model. When the different steps of this method are implemented in different system modules, the expanded source device model (including the convex gamut forming operation) communicates already modified colors to the gamut mapping algorithm and interface definition between system modules gets difficult. In such a system, common quality criteria for modification of colors would need to be implemented in different system components.

An object of the invention is to avoid the aforementioned drawbacks.

For this purpose, the subject of the invention is a method of mapping source colors in a color space from a source color device having an actual source gamut into target colors for a target color device having an actual target gamut, wherein at least one of the actual source gamut and the actual target gamut is non-convex, comprising the steps of:
  in order to represent the actual source gamut, creating a source convex gamut boundary descriptor and, if this actual source gamut is non-convex, a source non-convex gamut boundary descriptor,
  in order to represent the actual target gamut, creating a target convex gamut boundary descriptor and, if this actual target gamut is non-convex, a target non-convex gamut boundary descriptor,
then, for each source color to map,
1—if the actual source gamut is non-convex, and if said source color is located outside said source non-convex gamut boundary descriptor, pre-mapping said source color into a pre-mapped source color that is located inside said source non-convex gamut boundary descriptor,
2—main-mapping said source color if not pre-mapped or said pre-mapped source color into a target color that is located inside said target convex gamut boundary descriptor,
3—if the actual target gamut is non-convex, and at least if said main-mapped target color is located outside said target non-convex gamut boundary descriptor, post-mapping said main-mapped target color into a final target color that is located inside said target non-convex gamut boundary descriptor.

Preferably, said source non-convex gamut boundary descriptor, if any, is included into said source convex gamut boundary descriptor, and said target non-convex gamut boundary descriptor, if any, is included into said target convex gamut boundary descriptor.

Preferably, each source color to map is located inside said source convex gamut boundary descriptor.

If the main-target color is not post-mapped, then said main-mapped target color is not further mapped and becomes the final target color.

A color device means any kind of image output device, e.g. a film projector, a digital projector, a CRT or LCD monitor, a Digital Video Disc (DVD) storage device with linked monitor or a video cassette storage device with linked monitor, or any kind of image input or capturing device, e.g. a film camera in combination with a film scanner, an electronic camera, or an intermediate color device, for example a film printer (but without film projector), a color correction device (but without display) or any other color device working on color images.

The actual gamut of color device includes all the colors that can be inputted or outputted by the color device. The actual gamut boundary of this color device is the 2D surface that limits this actual gamut.

This invention consists of a gamut mapping method and device using not only a single Gamut Boundary Description (GBD) for non-convex color gamuts, but a plurality of Gamut Boundary Descriptions (GBDs), one of which being a usual convex hull. According to the position of the source colors to map, far away from a concave part of the actual gamut, or close to a concave part of the actual gamut, only the convex hull is used for the mapping, or other GBDs are used too. The invention has the following advantages with respect to known gamut mapping methods:
  Allows precise gamut mapping while allowing also for simple geometrical operations using convex gamuts.
  Allows tradeoff between precision and computational load/complexity.
  Allows simple geometrical operations using convex gamuts while not hiding the non-convex nature of the gamut.

Preferentially, each of said gamut boundary description is stored in a binary format that is compatible with the HDMI standard.

Another subject of the invention is a method to transform device-dependent source colors of said source color device into device-dependent target colors of said target color device, that includes the following steps:
  transforming device-dependent source colors into device-independent source colors by using a source color device model associated with said source color device,
  mapping device-independent source colors into device-independent target colors according to the invention,
  transforming device-independent target colors into device-dependent target colors by using a target color device model associated with said target color device.

The mapping is then performed in an device-independent color space, as the XYZCIE color space; perceptually uniform device-independent color space, as the LabCIE color space, may be used too, appearance device-independent color space that includes viewing conditions, as the CIECAM color spaces, may be used too.

The invention will be more clearly understood on reading the description which follows, given by way of non-limiting example and with reference to the appended figures in which:

FIG. 3 illustrates the creation of a Voronoi diagram and FIG. 4 illustrates the creation of a Delaunay triangulation that are used to create a non-convex GBD using the alpha-shape method.

FIG. 6 illustrates the pre-mapping step of the gamut mapping method of FIG. 5.

An embodiment of the invention will be now described of a method of mapping source colors from a source color device having an actual source gamut which is non-convex into target colors for another target color device having an actual target gamut which is also non-convex. A three-dimensional (N=3) color space CIEXYZ is chosen as the independent color space for the mapping. The GBDs consist of vertices spanning triangles that define the boundary as a 3D polyhedron.

1—Creation of the Plurality of Source GBDs and Target GBDs:

For each of the source and target actual color gamuts, a plurality of different GBDs are calculated. In this example, for each source and target, two GBDs are calculated, one being the so-called convex hull as a convex BGD for the actual color gamut, and the other one being the so-called non-convex hull as a non-convex GBD that describes the actual color gamut in a more precise way and that is completely included in the convex hull.

In the following is shown how the convex GBD and the non-convex GBD are calculated for the source color gamut. The convex GBD and the non-convex GBD for the target color gamut are calculated in a similar manner. We assume that the actual source color gamut is represented by a given set of source colors. We assume that these source colors sample precisely enough the actual color gamut. These source colors are points in the three-dimensional CIEXYZ color space. From these points or a selection of these points, the convex and the non-convex GBDs are to be generated.

A GBD describes the two-dimensional surface of a three-dimensional source color gamut in the color space. The GBD is based on an indexed triangle set. Triangles are elementary polygons. A GBD is basic network of elementary polygons that represents the actual gamut boundary of the source color device in the color space.

Figure 1:
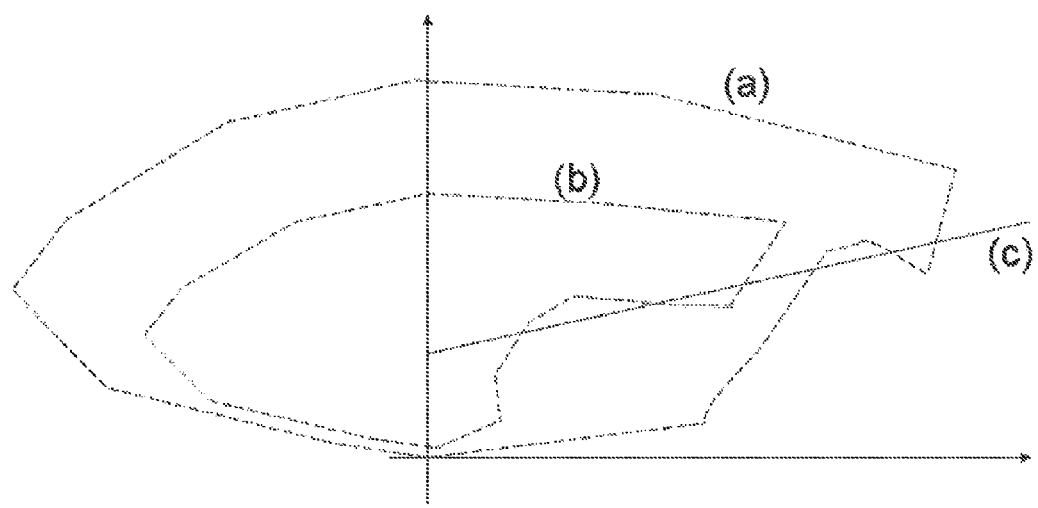
FIG. 1 illustrates a two-dimensional gamut mapping method that maps colors from a source non-convex GBD (a) into a target non-convex GBD (b) along a mapping line (c).
Figure 2:
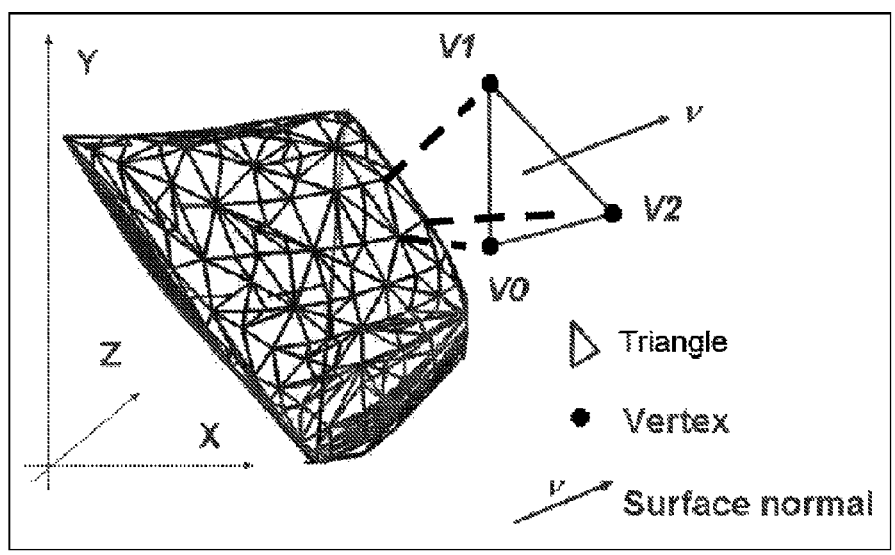
FIG. 2 shows the general principle of the creation of a GMD from a set of triangles.

This initial source GBD shown in FIG. 2 contains a set of vertices V0, V1, V2, V3, . . . . Each vertex is defined by its coordinates in the CIEXYZ mapping color space. Coordinates in CIEXYZ color space are often encoded in standardized RGB or YCbCr values.

This initial source GBD contains a set of triangles F0, F1, F2, F3, . . . . Let F0 being the sample triangle shown in FIG. 2. Triangle F0 is defined by three indices 0, 1, 2 of its three vertices V0, V1, V2. The set of triangles is called indexed triangle set. v is the surface normal of a triangle points outside the gamut. More details are given below on how to store these data in binary format with a compatibility with the HDMI format.

Usual convex hull algorithms aim to calculate a representation of surface being the convex hull of a set of given colors that are distributed all over the actual gamut and that could generally be measured using the source color device. We use here the so-called incremental algorithm, but other well-known algorithms such as gift warp or divide-and-conquer can be used instead.

From the selected colors that sample the surface of the actual gamut in the mapping color space, the following known incremental convex hull algorithm can be used here to build a convex hull that represents the initial source gamut boundary, while the vertices of the indexed triangle set are a subset of the given colors. To implement this known algorithm, the following steps are generally carried out:

1) creation of a first hull (a tetrahedron) from any four selected colors in the source color gamut;
2) take a new color;
3) if the new color is inside the first hull, go on with step 2;
4) as the new color is now outside the first hull, delete all triangles from the first hull that are visible by this new color;
5) create new triangles including the new color to make a second hull;
6) If not all colors have been processed, go on with step 2;
7) as all selected colors have now been processes, the last hull gives the convex GBD or convex hull.

The non-convex GBD is now calculated according to the approach of alpha-shapes, already mentioned. A alternative description of alpha shapes is given by J. Giesen, E. Schuberth, K. Simon and P. Zolliker presented in their paper entitled "Toward Image-dependent Gamut Mapping: Fast and Accurate Gamut Boundary Determination" published in 2005 in the Proceedings of the 17th Annual IS&T/SPIE Symposium on Electronic Imaging.

The non-convex GBD is calculated by the following steps:
1) Creation of a Voronoi diagram for the source colors. The Voronoi diagram a cell decomposition of the color space into tetrahedrons. Every tetrahedral Voronoi cell corresponds to exactly one source color and contains all colors of the color space that do not have a smaller distance to any other color of the set of given source colors, see FIG. 3.
2) Creation of a Delaunay triangulation of the source colors. The Delaunay triangulation is a cell complex that decomposes the convex hull of the source colors (the convex GBD) into volumic, tetrahedral cells having the source colors as vertices in a way that the intersection of each tetrahedral Delaunay cell with the Voronoi cells of its four vertices is not empty, see FIG. 4.
3) Based on a given value α, spheres of radius α are centered around each source color in the color space. For each of the tetrahedrals of the Delaunay triangulation, the common Voronoi vertex of the Voronoi tetrahedrals of the Delaunay vertices is determined. All Delaunay tetrahedrals are eliminated that have a common Voronoi vertex outside of a sphere of at least one of its Delaunay vertices. The value α can be calculated from the volume V of the volume described by the convex GBD according to $$\alpha = \frac{1}{8} \sqrt[3]{\frac{3 \cdot V}{4\pi}}.$$

The non-convex GBD is then obtained.

The Convex GBD and the Corresponding Non-Convex GBD are for Example Stored in a Binary Format as Follows.

The binary format starts with a basic header that contains a minimal set of gamut information according to the following table. The basic header that is proposed is advantageously compatible to High Definition Multimedia Interface (HDMI) gamut-related metadata. See table 1 below.

The FF and FM bits are the Format_Flag and Facet_Mode flags and should be zero for an advantageous compatibility with the HDMI standard. The ID flag is usually set to one indicating the presence of data after the basic header.

ID_PRECISION indicates how many bits are used per color channel in order to define the coordinates of a vertex in color space. The number of bits shall be one of: N=8 bits, N=10 bits, N=12 bits.

ID_SPACE indicates which color space is used in order to define the coordinates of vertices. Each color space has three color channels. ID_SPACE shall be one of:
- ITU-R BT.709, RGB space, encoding according to SMPTE 274M,
- xvYCC-601, YCbCr space, encoding according to IEC 61966-2-4-SD,
- xvYCC-709, YCbCr space, encoding according to IEC 61966-2-4-HD.

The packed basic vertices data define four vertices in color space that shall indicate black, red, green and blue of the actual color gamut. When these vertices are expressed as vectors $V_{BLACK}$, $V_{RED}$, $V_{GREEN}$, $V_{BLUE}$ in CIEXYZ color space, four more vectors $V_{MAGENTA}=V_{RED}+V_{BLUE}-V_{BLACK}$, $V_{CYAN}=V_{GREEN}+V_{BLUE}-V_{BLACK}$, $V_{YELLOW}=V_{RED}+V_{GREEN}-V_{BLACK}$, $V_{WHITE}=V_{RED}+V_{GREEN}+V_{BLUE}-2V_{BLACK}$ can be calculated giving a distorted cube in CIEXYZ color space. This cube should be an approximation of the actual color gamut.

TABLE 1

| Byte # | Size | Symbol | Description | | | | | | | | Values |
|---|---|---|---|---|---|---|---|---|---|---|---|
| (hex) | (byte) | | 7 | 6 | 5 | 4 | 3 | 2 | 1 | 0 | |
| 00 | 1 | N | FF | FM | ID | ID_PRECISION | | ID_SPACE | | | FF = 0b0 (1bit) FM = 0b0 (1 bit) ID = 0b1 (1 bit) ID_PRECISION (2 bits): 0b00: N = 8 bits 0b01: N = 10 bits 0b10: N = 12 bits ID_SPACE (3 bits): 0b000 ITU-R BT.709 RGB 0b001 xvYCC-601 (IEC 61966-2-4-SD) YCbCr 0b010 xvYCC-709 (IEC 61966-2-4-HD) YCbCr 0b011 reserved 0b100 reserved 0b101 reserved 0b110 reserved 0b111 reserved |
| 01 | 1 | | Number_Vertices_H | | | | | | | | 0h00 |
| 02 | 1 | | Number_Vertices_L | | | | | | | | 0h03 |
| 03 | VSIZE | | Packed basic vertices data | | | | | | | | See below |

VSIZE is the size of packed basic vertices data and is defined according to table 2:

TABLE 2

| N | VSIZE |
|---|---|
| 8 | 12 |
| 10 | 15 |
| 12 | 18 |

Packing of vertices: The packed basic vertices data contains encoded color values, in this order, either RGB or YCbCr or XYZ. The vertices are listed in the following order black, red, green, blue. When N=8, the 12 color values are directly coded into 12 bytes. When N=10 or N=12, the vertices are packed according to the following tables 3 and 4, respectively.

TABLE 3

| Relative byte # | Size | Description | | | | | | | |
|---|---|---|---|---|---|---|---|---|---|
| (hex) | (bytes) | 7 | 6 | 5 | 4 | 3 | 2 | 1 | 0 |
| 00 | 1 | A_high | | | | | | | |
| 01 | 1 | A_low | | | | B_high | | | |
| 02 | 1 | B_low | | | | C_high | | | |
| 03 | 1 | C_low | | | | | | D_high | |
| 04 | 1 | D_low | | | | | | | |

TABLE 4

| Relative byte # | Size | Description | | | | | | | |
|---|---|---|---|---|---|---|---|---|---|
| (hex) | (bytes) | 7 | 6 | 5 | 4 | 3 | 2 | 1 | 0 |
| 00 | 1 | A_high | | | | | | | |
| 01 | 1 | A_low | | | | B_high | | | |
| 02 | 1 | B_low | | | | | | | |
| 03 | 1 | C_high | | | | | | | |
| 04 | 1 | C_low | | | | D_high | | | |
| 05 | 1 | D_low | | | | | | | |

Extended header: The extended header follows the basic header and is defined according to the following table 5.

TABLE 5

| Byte # (hex) | Size (bytes) | Symbol | Description | Values (decimal) |
|---|---|---|---|---|
| VISZE + 03 | 2 | ID_GI | Offset to Gamut Instances (GI) | [0; 0hFFFF] |
| VISZE + 05 | 2 | | Reserved | 0h0000 |
| VISZE + 07 | 2 | | Reserved | 0h0000 |
| VISZE + 09 | 2 | ID_F | Offset to facets | [0; 0hFFFF] |
| VISZE + 0B | 2 | ID_V | Offset to vertices | [0; 0hFFFF] |
| VISZE + 0D | 1 | | Reserved | 0 |
| VISZE + 0E | 1 | | Reserved | 0 |
| VISZE + 0F | 1 | | Reserved | 0 |
| VISZE + 10 | 2 | | Reserved | 0 |
| VISZE + 12 | 1 | | Reserved | 0 |
| VISZE + 13 | 1 | X | Convex or non-convex shape X = 1: all GIs shall be convex X = 2: GIs may be convex or non-convex | 1 ≤ X ≤ 2 |

16 bit integer or address values are encoded into 2 bytes with the MSBs in the first byte and the LSBs in the second byte.

ID_GI, ID_F and ID_V give the offset in bytes from the beginning of Gamut ID metadata to the beginning of Gamut Instances, facets and vertices data, respectively.

X indicates whether the binary format uses only convex shapes (X=1) or may use convex and non-convex shapes (X=2). When X=1, each GI shall correspond to a convex shape. When X=2, GIs are organized into pairs. Each pair contains a first GI (marked as "convex") that corresponds to the convex GBD. The second GI of the pair (marked as "non-convex") may correspond to a non-convex shape and is set to the non-convex GBD. The binary format contains at least X GIs.

Gamut Instances (GI): The binary format contains one or more descriptions of the actual color gamut, either source or target. One single description is called Gamut Instance (GI). A receiver of this binary format may use any one or any number of GIs of the binary format. The GIs are defined by a list of GIs from byte number ID_GI on according to the following table 6. The order in the list is arbitrary but fixed.

TABLE 6

| Byte # (hex) | Size (bytes) | Symbol | Description | Values |
|---|---|---|---|---|
| ID_GI | 1 | I | Total number of Gamut Instances (GI) | I = X |
| ID_GI + 01 | 7 + $\lceil F_0 \lceil ld(F) \rceil / 8 \rceil$ | | Definition of GI no. 0 | |
| ID_GI + 01 + 07 + $\lceil F_0 \lceil ld(F) \rceil / 8 \rceil$ | 7 + $\lceil F_1 \lceil ld(F) \rceil / 8 \rceil$ | | Definition of GI no. 1 | |
| ID_GI + 01 + $\sum_{c=0}^{C-2}(07 + \lceil F_c \lceil ld(F) \rceil / 8 \rceil)$ | 7 + $\lceil F_{C-1} \lceil ld(F) \rceil / 8 \rceil$ | | Definition of GI no. I-1 | |

I is the number of GIs and shall be equal to the X. Each GI is defined according to the following table 7:

TABLE 7

| Relative byte # (hex) | Size (bytes) | Symbol | Description | Values |
|---|---|---|---|---|
| 00 | 1 | | Reserved | 0 |
| 01 | 2 | | Reserved | 0 |
| 03 | 1 | $X_i^{GI}$ | This GI defines a convex shape ($X_i^{GI} = 1$) or may define a non-convex shape ($X_i^{GI} = 2$) | $1 \leq X_i^{GI} \leq X$ (X see above) |
| 04 | 1 | | Reserved | 0 |
| 05 | 2 | $F_i$ | Number of facets referenced by this GI | $1 \leq F_i \leq F$ (F see below) |
| 07 | $\lceil F_i \lceil ld(F) \rceil / 8 \rceil$ | | Indices of referenced facets | [0; F − 1] Must be valid indices of facets, F see below |

$X_i^{GI}$ is an indicator on convex or non-convex shape. If $X_i^{GI}=1$, the i-th GI defines a convex shape. If $X_i^{GI}=2$, the i-th GI may define a convex or a non-convex shape.

$F_i$ is the number of facets that are referenced by the i-th GI. A GI references at least four facets.

The indices of the facets are packed into bytes. Each index of a facet takes ld(F) bits. Packing is organized GI wise, i.e. the first facet index of a GI always starts at the beginning of a byte.

An example of packing is given for the case of I=2 Gamut Instances (GI) each using $F_0=F_1=6$ facets from a total of F=8 facets. Each GI takes $\lceil (\lceil ld(F) \rceil F_i)/8 \rceil = \lceil (\lceil ld(8) \rceil 6)/8 \rceil = 3$ bytes for the indices of the facets. Packing is for example as follows in table 8:

TABLE 8

| Byte # (hex) | Size | Value (binary) |||||||| 
|---|---|---|---|---|---|---|---|---|---|
| | | 7 | 6 | 5 | 4 | 3 | 2 | 1 | 0 |
| ID_GI | 1 | 0b00000000 |||||||| 
| ID_GI + 01 | 1 | 0b00000000 |||||||| 
| ID_GI + 02 | 1 | 0b00000000 |||||||| 
| ID_GI + 03 | 1 | 0b00000000 |||||||| 
| ID_GI + 04 | 1 | 0b00000000 |||||||| 
| ID_GI + 05 | 1 | 0 (MSB) |||||||| 
| ID_GI + 06 | 1 | 0b110 (LSB) |||||||| 
| ID_GI + 07 | 1 | 1. index ||| 2. index ||| 3. index MSB || 
| ID_GI + 08 | 1 | 3. i. LSB || 4. index ||| 5. index || 6. i. MSB | 
| ID_GI + 09 | 1 | 6. index LSBs |||||| Unused || 
| ID_GI + 0A | 1 | 0b00000000 |||||||| 
| ID_GI + 0B | 1 | 0b00000000 |||||||| 
| ID_GI + 0C | 1 | 0b00000000 |||||||| 
| ID_GI + 0D | 1 | 0b00000001 |||||||| 
| ID_GI + 0E | 1 | 0b00000000 |||||||| 
| ID_GI + 0F | 1 | 0 (MSB) |||||||| 
| ID_GI + 10 | 1 | 0b110 (LSB) |||||||| 
| ID_GI + 11 | 1 | 1. index ||| 2. index ||| 3. index MSBs || 
| ID_GI + 12 | 1 | 3. i. LSB || 4. index ||| 5. index || 6. i. MSB | 
| ID_GI + 13 | 1 | 6. index LSB |||||| Unused ||

LSB is least significant bit and MSBs is most significant bits.

Facets: The facets are defined by a list of facets from byte number ID_F on according to the following table 9. The order in the list is arbitrary but fixed.

TABLE 9

| Byte # (hex) | Size | Symbol | Description | Values |
|---|---|---|---|---|
| ID_F | 2 | F | Total number of Facets | 1 < F < 65535 |
| ID_F + 02 | ⌈3F⌈ld(V)⌉/8⌉ | | 3F indices of Vertices | [0; V − 1] Must be a valid indices of Vertices |

F is the total number of facets of the Gamut ID metadata. For each facet, three indices of vertexes are indicated, in total 3F indices.

The indices of the vertices of all facets are packed into bytes. Each index of a facet takes ld(V) bits, for V see below.

An example of packing is given for the case of F=4 facets and V=4 vertices. Each index of a facet takes ld(V)=2 bits. All indices take ⌈3F⌈ld(V)⌉/8⌉=3 bytes. An example of packing is given in table 10.

TABLE 10

| Byte # (hex) | Size | Value Bits |||||||| 
|---|---|---|---|---|---|---|---|---|---|
| | | 7 | 6 | 5 | 4 | 3 | 2 | 1 | 0 |
| ID_F | 2 | 0h0004 |||||||| 
| ID_F + 02 | 1 | F0 index0 || F0 index1 || F0 index2 || F1 index0 || 
| ID_F + 03 | 1 | F1 index1 || F1 index2 || F2 index0 || F2 index1 || 
| ID_F + 04 | 1 | F2 index2 || F3 index0 || F3 index1 || F3 index2 ||

Vertices: The vertices are defined by a list of vertices from byte number ID_V on, see the following table 11. The order in the list is arbitrary but fixed.

TABLE 11

| Byte # (hex) | Size | Symbol | Description | Values |
|---|---|---|---|---|
| ID_V | 2 | V | Total number of vertices | 1 < V < 65535 |
| ID_V + 02 | ⌈3VN/8⌉ | | 3V encoded color values defining V vertices | According to color encoding |

Hereby is ⌈•⌉ the operation that rounds to the next upper integer.
V is the total number of vertices of Gamut ID metadata (not counting the four basic vertices of the basic header).

As detailed above, a source convex gamut boundary descriptor (or source convex hull) and a source non-convex gamut boundary descriptor (or source non-convex hull) have then been created to represent the actual source gamut of the source color device. Similarly, a target convex gamut boundary descriptor (or target convex hull) and a target non-convex gamut boundary descriptor (or target non-convex hull) are created to represent the actual target gamut of the target color device.

Figure 5:
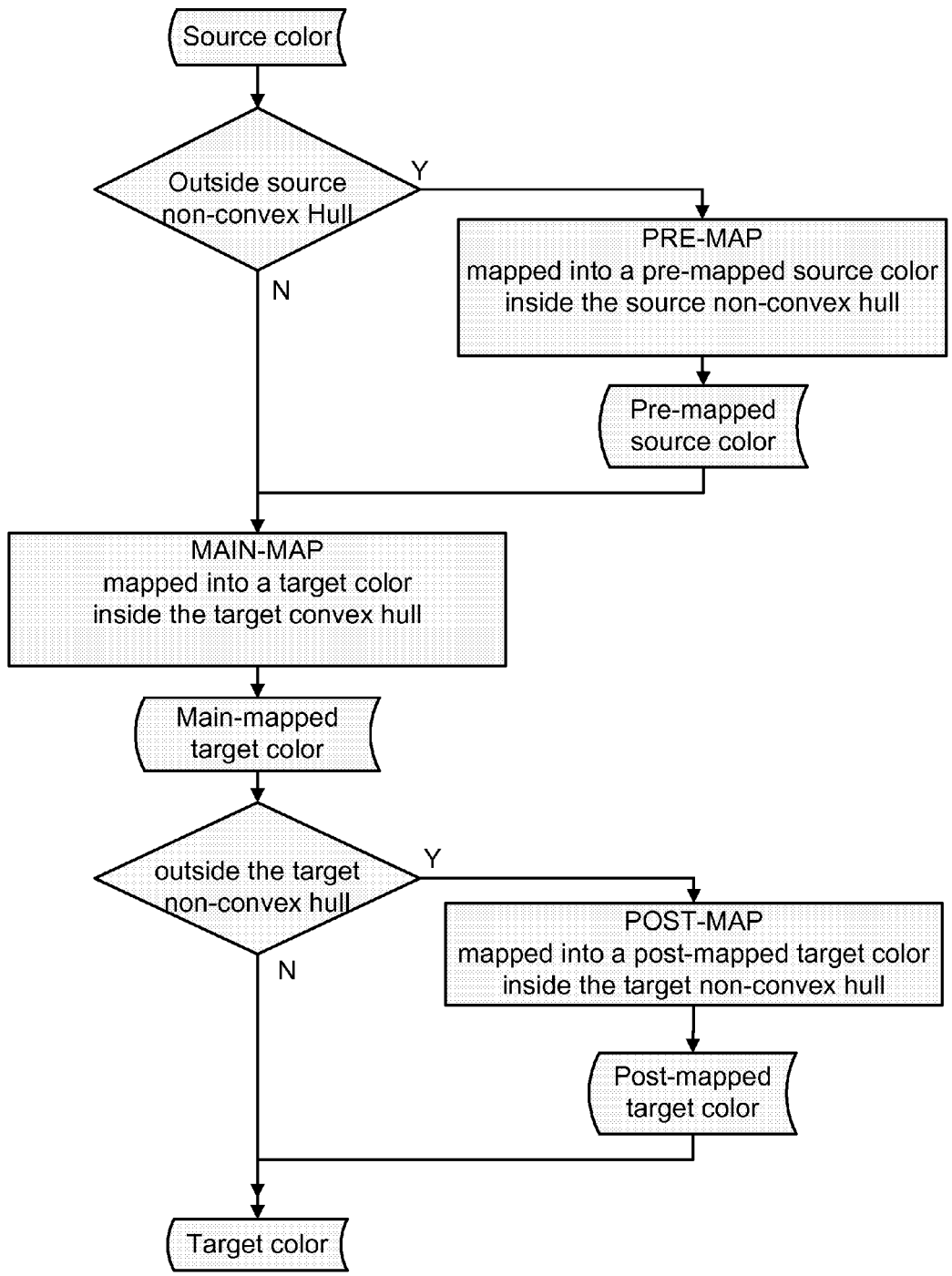
FIG. 5 is a diagram of an embodiment of the gamut mapping method according to the invention.

The mapping method of a source color will now be described in reference to the diagram of FIG. 5.

2—Pre-Mapping Step

The following gamut mapping steps are now carried out in the CIELab color space. The smoothed final GBD is transformed from CIEXYZ space into CIELab space by transforming simply the color coordinates of the vertices.

If the source color to map is located inside the source GBD but outside the source non-convex GBD, this source color is pre-mapped into a pre-mapped source color that is located inside the source non-convex GBD. During this step, each source color of the set of source colors to be mapped that is located outside the non-convex hull of the set of source GBDs is mapped into a pre-mapped color inside the non-convex source GBD.

The following steps are carried out:
1) Each source color is tested to be inside or outside of the non-convex source GBD. Therefore, a ray is traced from a source color into a set of directions. For each ray, the number of intersections with triangles of the non-convex GBD is counted. Rays with numerical problems such as rays that are collinear with one of the triangles are excluded from processing. When the number of intersections in each ray is impair, the source color is said to be inside, else outside, of the non-convex GBD. The following steps are executed for all source colors outside the non-convex GBD.
2) For each source color, a mapping line is defined as follows. From all points in color space belonging to the surface described by the non-convex source GBD and not lying on the surface described by the convex source GBD, the closest point to the source color is determined. The mapping line is the line going from the source color to said closest point. Said closest point is the intersection of the mapping line with the non-convex GBD.
3) As shown in FIG. 6, each source color is mapped along the mapping line onto a pre-mapped source color that is located inside the non-convex GBD. This pre-mapping is performed by the following sub-steps:
1) The intersection of the mapping line with the convex GBD is determined.

2) The distance D between the intersections of the mapping line with the non-convex and with the convex GBDs, respectively, is determined.
3) A local anchor point is defined on the mapping line having the distances (1+d)D and dD from the intersections with the convex and non-convex source GBDs, respectively, with d a value between 0 and 1, typically ¼.
4) The source color is mapped along the mapping line onto a pre-mapped source color such that the distance E' between the local anchor point and the pre-mapped source color is E'=d/(D+d)E with E the distance between the local anchor point and the source color.

In a variant, if d>0, the pre-mapping step is not only applied to the source colors that are located outside the non-convex hull of the set of source GBDs but also to all source colors that have are located on their mapping line as defined above between the anchor point and the intersection of the mapping line with the non-convex GBD.

3—Main-Mapping Step

This step aims to map, using any known method, the source color if not being pre-mapped, or the pre-mapped source color, into a target color that is located inside the target GBD.

For gamut main-mapping, straight lines are used classically as mapping curves defined as all lines crossing the point—called anchor point—on the lightness axis with L=50. As a known variant, other anchor points or multiple anchor points can be used.

Figure 7:
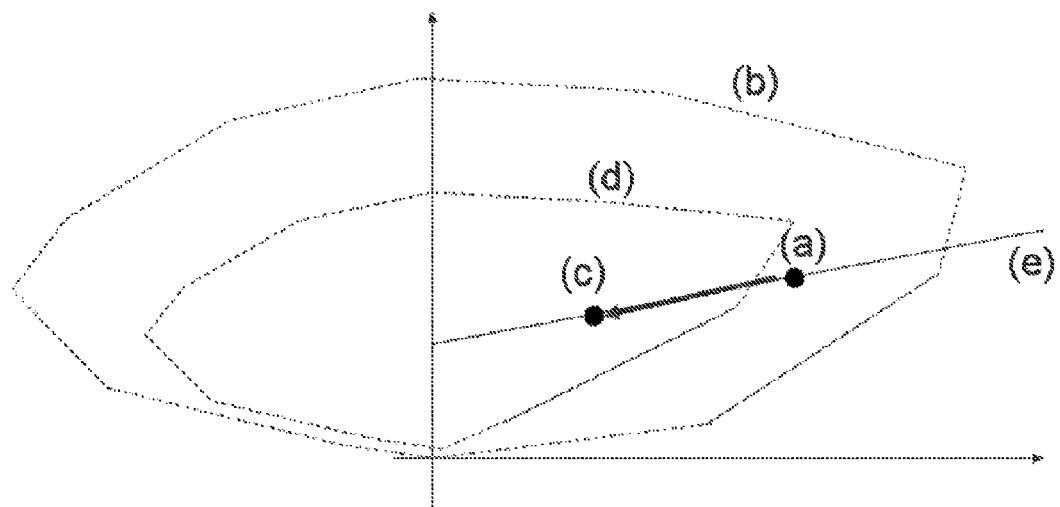
FIG. 7 illustrates the main-mapping step of the gamut mapping method of FIG. 5.

Each source color or pre-mapped color is mapped onto a target color in direction to the anchor point such that the target color is inside the convex target GBD, as shown in FIG. 7. Since straight lines are chosen as mapping trajectory, the mapping can be described as a modification of distance D of the source color (or pre-mapped color) into the distance D' of the target color. In this case, known algorithms can be used for mapping.

In the paper of Montag and Fairchild entitled "Gamut mapping: Evaluation of chroma clipping techniques for three destination gamuts" published in 1998 at the IS&T/SID Sixth Color Imaging Conference in Scottsdale, four mapping techniques are described: scaling-clipping, knee-function mapping, Gentile's mapping, and three segments mapping.

To map a source color (or pre-mapped color) with a distance D into a target color with a distance D' on a given mapping trajectory, we use here a mapping function along a mapping curve which is defined by three segments:
- a first segment with a mapping "slope" equal to 1 (i.e. D'=D), where the mapping "slope" is the ratio D'/D.
- a last segment being a so-called hard clipping (i.e. $D'=D_{output}^{MAX}$=const.), and
- a middle segment connecting linearly the first segment with the last segment, as expressed below.

Globally, the distance D' of a target color is expressed in function of the distance D of a source color (or pre-mapped color) on the same mapping trajectory as follows:

$$D' = \begin{cases} D & 0 \leq D \leq D_{inflection} \\ \dfrac{(D_{output}^{MAX} - D_{inflection})(D - D_{inflection})}{D_{clipping} - D_{inflection}} & \text{if } D_{inflection} < D \leq D_{clipping} \\ D_{output}^{MAX} & D_{clipping} < D \leq D_{input}^{MAX} \end{cases}$$

where D is the value to map; $D_{input}^{MAX}$ is the maximum input value, for example determined by the limits of CIE L*a*b* space; $D_{output}^{MAX}$ is the maximum output value.

This mapping function D'=f(D) uses two parameters:
$D_{inflection}$ which is the distance where the first segment (of slope one) stops and the middle segment begins,
$D_{clipping}$ is the distance where the middle segment stops and the last segment of hard clipping begins; this distance is the so-called cut off value for clipping.

Then, target colors are obtained.

4—Post-Mapping Step

This step is performed when the main-mapped target color that is obtained at the previous step 3 is located outside the target non-convex GMD. Then, the main-mapped target color is post-mapped into a final target color that is located inside the target non-convex GBD.

Figure 8:
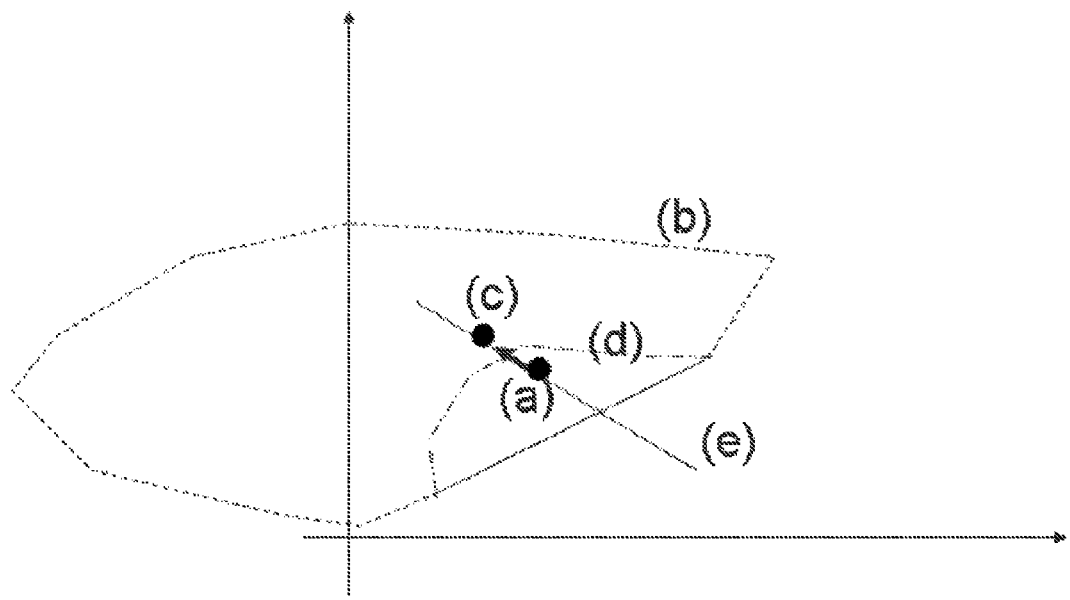
FIG. 8 illustrates the post-mapping step of the gamut mapping method of FIG. 5.

The following steps are carried out:
1) Each of the main-mapped colors is tested to be inside or outside of the non-convex target GBD as already explained above for the case of a source color and the non-convex source GBD. The following steps are then executed for all main-mapped colors that are tested to be outside the non-convex target GBD.
2) For each of these outside colors, a mapping line is defined in a same way as described above for the pre-mapping step.
3) As shown in FIG. 8 and as for the pre-mapping step, each outside color is mapped along this mapping line onto a final target color located inside the non-convex target GBD.

In a variant, if d>0, the post-mapping is also applied to all main-mapped colors that have are located on their mapping line as defined above between the anchor point and the intersection of the mapping line with the non-convex target GBD.

If the main-target color that is obtained in step 3 is not post-mapped, then this main-mapped target color is not further mapped and becomes the final target color.

After having performed the aforementioned steps for each of the source colors to map, an entire set of final target colors is obtained.

Figure 9:
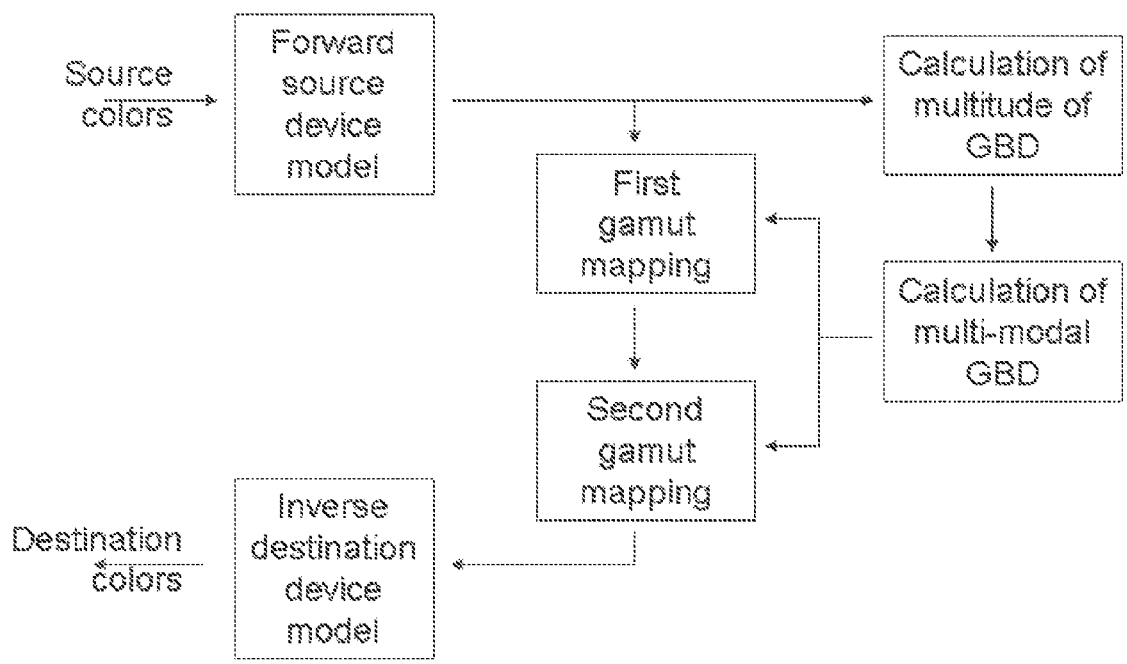
FIG. 9 is a diagram of another embodiment according to the invention, where source colors to map are device-dependant, and where target colors that are obtained are device-dependant too.

FIG. 9 discloses the diagram of the mapping method that is used when starting from device-dependent source colors and when device-dependent targets colors are desired in order to be able to control directly the target color device. Before applying the gamut mapping method according to the invention, device-dependent source colors are transformed into device-independent source colors using a forward source device model, and after applying the gamut mapping method according to the invention, device-independent target colors are transformed into device-dependent target colors using an inverse target device model. No expanded forward or inverse target device model is necessary as in the document WO2007/024494 already mentioned.

The gamut method that has been described according to the invention has the following advantages with respect to previous gamut mapping methods:
Allows precise gamut mapping while allowing also for simple geometrical operations using convex gamuts.
Allows tradeoff between precision and computational load/complexity.
Allows simple geometrical operations using convex gamuts while not hiding the non-convex nature of the gamut.

While the present invention is described with respect to a particular embodiment and variants, it is understood that the present invention is not limited to this embodiment and variants. The present invention as claimed therefore includes variations from this embodiment and variants described herein, as will be apparent to one of skill in the art. While some of the specific embodiments may be described and claimed separately, it is understood that the various features of embodiments described and claimed herein may be used in combination.

The invention claimed is:

1. A method of mapping source colors in a color space, from a source color device having an actual source gamut into target colors in the given color space, for a target color device having an actual target gamut, wherein at least one of the actual source gamut and the actual target gamut is non-convex, comprising the steps of:

creating a source convex gamut boundary descriptor in order to represent the actual source gamut and, if this actual source gamut is non-convex, creating a source non-convex gamut boundary descriptor that is included in said source convex gamut boundary descriptor in the given color space, creating a target convex gamut boundary descriptor in order to represent the actual target gamut and, if this actual target gamut is non-convex, creating a target non-convex gamut boundary descriptor that is included in said target convex gamut boundary descriptor in the given color space, then, for each source color to map, A—if the actual source gamut is non-convex, and if said source color is located outside said source non-convex gamut boundary descriptor, pre-mapping said source color into a pre-mapped source color that is located inside said source non-convex gamut boundary descriptor, and B—main-mapping said source color if not pre-mapped or said pre-mapped source color into a target color that is located inside said target convex gamut boundary descriptor, and C—if the actual target gamut is non-convex, and at least if said main-mapped target color is located outside said target non-convex gamut boundary descriptor, post-mapping said main-mapped target color into a final target color that is located inside said target non-convex gamut boundary descriptor, wherein when the actual source gamut is non-convex, at least one source color to map is located outside said source non-convex gamut boundary descriptor, and/or wherein when the actual target gamut is non-convex, at least one main-mapped target color is located outside said target non-convex gamut boundary descriptor.

2. The method of mapping according to claim 1 wherein each source color to map is located inside said source convex gamut boundary descriptor.

3. The method of mapping according to claim 1, wherein each of said gamut boundary description is stored in a binary format that is compatible with the HDMI standard.

4. The method to transform device-dependent source colors of said source color device into device-dependent target colors of said target color device, wherein it includes the following steps:

transforming device-dependent source colors into device-independent source colors by using a source color device model associated with said source color device, mapping device-independent source colors into device-independent target colors according to claim 1, and transforming device-independent target colors into device-dependent target colors by using a target color device model associated with said target color device.

* * * * *